US011827273B2

United States Patent
Miyazaki et al.

(10) Patent No.: US 11,827,273 B2
(45) Date of Patent: Nov. 28, 2023

(54) PARKING ASSIST DEVICE AND PARKING ASSIST METHOD

(71) Applicant: HITACHI ASTEMO, LTD., Hitachinaka (JP)

(72) Inventors: Akitoshi Miyazaki, Hitachinaka (JP); Yoshitaka Fukasawa, Hitachinaka (JP); Tomoyasu Sakaguchi, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 394 days.

(21) Appl. No.: 17/288,105

(22) PCT Filed: Oct. 16, 2019

(86) PCT No.: PCT/JP2019/040568
§ 371 (c)(1),
(2) Date: Apr. 23, 2021

(87) PCT Pub. No.: WO2020/095636
PCT Pub. Date: May 14, 2020

(65) Prior Publication Data
US 2021/0380168 A1 Dec. 9, 2021

(30) Foreign Application Priority Data
Nov. 9, 2018 (JP) .................................. 2018-211272

(51) Int. Cl.
*B60W 30/06* (2006.01)
*B62D 15/02* (2006.01)
*B60T 7/12* (2006.01)

(52) U.S. Cl.
CPC ............ *B62D 15/0285* (2013.01); *B60T 7/12* (2013.01); *B60W 30/06* (2013.01); *B60T 2201/10* (2013.01)

(58) Field of Classification Search
None
See application file for complete search history.

(56) References Cited

U.S. PATENT DOCUMENTS

| | | | | |
|---|---|---|---|---|
| 5,313,395 A * | 5/1994 | Kawai | .................... | F02D 31/005 123/339.23 |
| 11,511,714 B2 * | 11/2022 | Terasaka | ............. | B60T 8/17616 |
| 2005/0075826 A1 * | 4/2005 | Kitazawa | ............. | B60K 31/047 702/141 |
| 2008/0148827 A1 * | 6/2008 | Keski-Hynnila | ..... | G01M 15/05 73/114.74 |
| 2015/0134213 A1 * | 5/2015 | Matsubara | ............ | B60W 10/06 701/54 |

(Continued)

FOREIGN PATENT DOCUMENTS

JP 2014-008939 A 1/2014

*Primary Examiner* — Muhammad Adnan
(74) *Attorney, Agent, or Firm* — Volpe Koenig

(57) ABSTRACT

The vehicle stop position accuracy is improved. A parking assist device, which assists parking of a vehicle at a target stop position, includes: a traveling distance calculation unit that calculates a traveling distance of the vehicle based on a wheel speed pulse; and a braking/driving force calculation unit that determines a remaining distance to the target stop position based on the traveling distance, and switches control of the braking force of the vehicle from feedback control to feedforward control when the remaining distance becomes a value equal to or less than a predetermined value.

11 Claims, 13 Drawing Sheets

(56) References Cited

U.S. PATENT DOCUMENTS

| | | |
|---|---|---|
| 2016/0001774 A1 | 1/2016 | Nakada et al. |
| 2019/0283581 A1* | 9/2019 | Yokota .................... B60T 7/12 |
| 2020/0031336 A1* | 1/2020 | Akatsuka .............. B60W 10/18 |
| 2023/0174151 A1* | 6/2023 | Han .................... B62D 15/025 |
| | | 180/415 |

\* cited by examiner

COMPARATIVE EXAMPLE

PARKING ASSIST DEVICE AND PARKING ASSIST METHOD

TECHNICAL FIELD

The present invention relates to a parking assist device and a parking assist method.

BACKGROUND ART

As an example of the parking assist device, there is a technique described in PTL 1. The parking assist device described in PTL 1 calculates a traveling distance and a vehicle speed of a host vehicle using wheel speed pulses, and performs acceleration/deceleration control by PI control so as to follow a target vehicle speed.

CITATION LIST

Patent Literature

PTL 1: JP 2014-8939 A

SUMMARY OF INVENTION

Technical Problem

In automatic parking, there is known a technique for controlling a braking force by feedback control using a difference between a target vehicle speed and a vehicle speed detection value as a countermeasure against disturbances such as a change in vehicle weight and a gradient depending on the number of passengers. However, when the vehicle speed is detected using the wheel speed pulse, the parking assist device is likely to erroneously recognize the vehicle speed as high and stop the host vehicle in front of a target position at an extremely low vehicle speed just before the stop because it is difficult to update the vehicle speed detection due to a long input interval of the wheel speed pulse.

FIG. 6 illustrates a specific operation. FIG. 6 illustrates graphs of a vehicle speed and a braking force with respect to a distance when the braking force is controlled only by feedback control. In the graph of the vehicle speed, the horizontal axis represents the distance from the start of parking assist, and the vertical axis represents the vehicle speed. In the graph of the braking force, the horizontal axis represents the distance from the start of parking assist, and the vertical axis represents the braking force. A dashed line indicates a target vehicle speed profile, a two-dot chain line indicates a vehicle speed detection value, and a solid line indicates an actual vehicle speed.

From distances L0 to L1, the vehicle speed detection value is less than the target vehicle speed, and thus, the acceleration feedback control works, and the braking force becomes zero. From distances L1 to L2, the vehicle speed detection value is more than the target vehicle speed, and thus, the feedback control works, and the braking force increases. The vehicle speed detection value is updated by detecting the wheel speed pulse at the distance L2, and a difference between the vehicle speed detection value and the target vehicle speed becomes smaller, so that the braking force decreases. From the distance L2 to a target parking position, the vehicle speed detection value is more than the target vehicle speed, and thus, the feedback control works, and the braking force increases.

Since there is no wheel speed pulse detection between the distance L2 and the target parking position, the vehicle speed detection value is not updated. As a result, the braking force increases as the difference between the target vehicle speed and the vehicle speed detection value increases, so that the vehicle is likely to stop in front of the target position.

Solution to Problem

A typical example of the present invention is a parking assist device that assists parking of a vehicle at a target stop position, and includes: a traveling distance calculation unit that calculates a traveling distance of the vehicle based on a wheel speed pulse; and a braking/driving force calculation unit that determines a remaining distance to the target stop position based on the traveling distance, and switches control of the braking force of the vehicle from feedback control to feedforward control when the remaining distance becomes a value equal to or less than a predetermined value.

Advantageous Effects of Invention

According to a typical example of the present invention, the vehicle stop position accuracy can be improved.

DESCRIPTION OF EMBODIMENTS

Hereinafter, embodiments will be described with reference to the drawings. The embodiments to be described hereinafter do not limit the present invention according to the claims, and further, all of the combinations of features described in the embodiments are not necessarily indispensable for the solution of the invention.

First Embodiment

Figure 1:
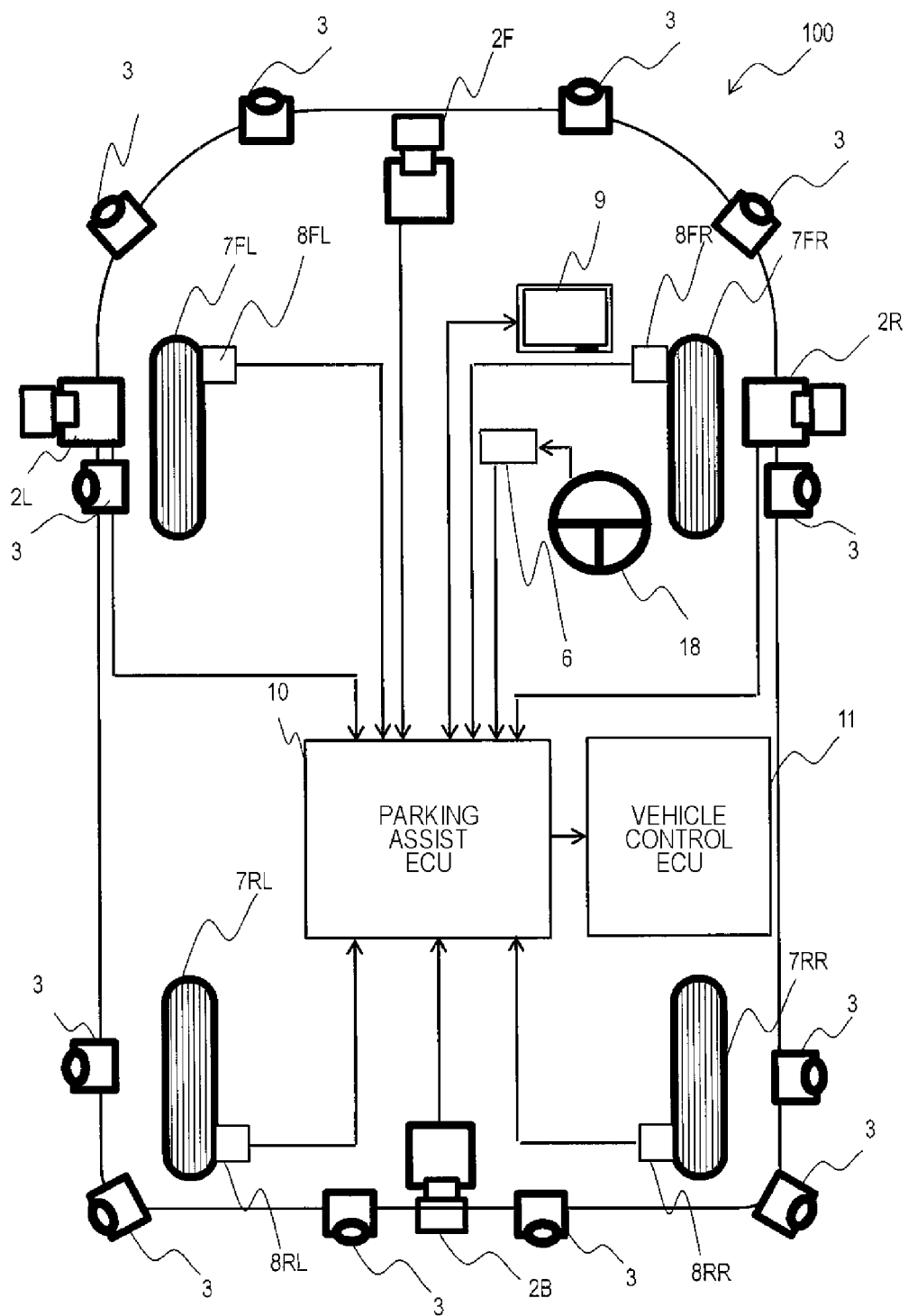
FIG. 1 is a configuration diagram of a vehicle to which a parking assist device is applied.

FIG. 1 schematically illustrates a parking assist device according to one embodiment. The parking assist device is mounted on a vehicle 100, and includes a front camera 2F mounted on the front side of the vehicle, a right camera 2R mounted on the right side of the vehicle, a rear camera 2B mounted on the rear side of the vehicle, a left camera 2L mounted on the left side of the vehicle, sonars 3, and an electric power steering device 6. In addition, the parking assist device further includes a right front wheel speed sensor 8FR that detects a wheel speed of a right front wheel 7FR, a right rear wheel speed sensor 8RR that detects a wheel speed of a right rear wheel 7RR, a left rear wheel speed sensor 8RL that detects a wheel speed of a left rear wheel 7RL, a left front wheel speed sensor 8FL that detects a wheel speed of a left front wheel 7FL, an in-vehicle display device 9, a parking assist electronic control unit (ECU) 10, a vehicle control ECU 11, and the like.

Each of the front camera 2F, the right camera 2R, the rear camera 2B, and the left camera 2L includes a lens and an imaging element, and is appropriately arranged so as to be capable of imaging the surrounding environment of the host vehicle 100. Captured images of the respective cameras 2F, 2R, 2B, and 2L are transmitted to the parking assist ECU 10 to be subjected to image processing. Hereinafter, each of the cameras 2F, 2R, 2B, and 2L is referred to as a camera 2 unless otherwise specified. The camera 2 may be a monocular camera or a stereo camera.

The plurality of sonars 3 are installed in a front portion, a rear portion, and side surface portions of the vehicle 1. Each of the sonars 3 transmits an ultrasonic wave and receives a reflection wave of the ultrasonic wave reflected from a peripheral obstacle to measure a distance between the vehicle 100 and the peripheral obstacle. The measurement result is transmitted to the parking assist ECU 10. The parking assist ECU 10 stores obstacle information around the host vehicle 100 which is the measurement result transmitted from each of the sonars 3.

The camera 2 and the sonar 3 constitute a surroundings information acquisition unit configured to acquire surroundings information around the host vehicle 100. Note that the surroundings information around the host vehicle 100 may be acquired by using a sensing device other than the camera 2 and the sonar 3, for example, light detection and ranging (LIDAR) or RADAR.

The right front wheel 7FR, the right rear wheel 7RR, the left rear wheel 7RL, and the left front wheel 7FL are arranged on the front, rear, left, and right sides of a vehicle body of the vehicle 100. The wheels 7FR, 7RR, 7RL, and 7FL are provided with a right front wheel speed sensor 8FR, a right rear wheel speed sensor 8RR, a left rear wheel speed sensor 8RL, and a left front wheel speed sensor 8FL, respectively. Each of the wheel speed sensors 8FR, 8RR, 8RL, and 8FL detects each wheel speed and transmit each wheel speed to the parking assist ECU 10.

The parking assist ECU 10 calculates the speed of the host vehicle 100 based on information on each wheel speed. Hereinafter, each of the right front wheel 7FR, the right rear wheel 7RR, the left rear wheel 7RL, and the left front wheel 7FL is referred to as a wheel 7 unless otherwise specified. Further, each of the right front wheel speed sensor 8FR, the right rear wheel speed sensor 8RR, the left rear wheel speed sensor 8RL, and the left front wheel speed sensor 8FL is referred to as a wheel speed sensor 8. The wheel speed sensor 8 outputs a wheel speed pulse every time the wheel 7 advances (rotates) by a specified distance (one wheel speed pulse interval distance). The pulse interval is, for example, several cm.

The electric power steering device 6 changes a direction of the wheel 7 according to an operation amount (steering angle) of a steering wheel 18 provided in a driver's cab of the host vehicle 100. The electric power steering device 6 includes, for example, a steering angle sensor that detects a steering angle of the steering wheel 18, a motor that assists a steering torque, which is the torque that changes the direction of each of the wheels 7, and an electric power steering ECU that controls the steering torque (none of which are illustrated).

The electric power steering device 6 controls the steering torque to assist the driver's operation on the steering wheel 18 to change the direction of the wheel 7. The steering angle detected by the steering angle sensor of the electric power steering device 6 is transmitted to the parking assist ECU 10. The parking assist ECU 10 calculates a progressing direction of the host vehicle 100 based on information on the steering angle.

The in-vehicle display device 9 is provided in the driver's cab of the host vehicle 100 and provides various types of information to the driver. The information provided to the driver includes, for example, an image captured by the camera 2 and processed by the parking assist ECU 10. In addition, the in-vehicle display device 9 presents one or more parking target candidate positions (available parking places or positions) to the driver as will be described later.

The in-vehicle display device 9 may be configured as, for example, a touch panel in which a display and an input device are integrated, may be a part of a car navigation system, or may be configured as a heads-up display. The in-vehicle display device 9 may include an information input device such as a keyboard, a voice instruction device, and a switch. For example, a screen of the in-vehicle display device 9 is equipped with a pressure-sensitive or electrostatic touch panel, which enables various input operations. The driver can transmit an input content to the parking assist ECU 10 by performing the input operation on the touch panel.

The parking assist ECU 10 calculates one or more parking target candidate positions of the host vehicle 100 based on the surroundings information received from the camera 2 and the sonar 3 (surroundings information acquisition unit), and also calculates peripheral obstacle information. The one or more parking target candidate positions are transmitted to the in-vehicle display device 9.

The in-vehicle display device 9 displays the one or more parking target candidate positions transmitted from the parking assist ECU 10 to be superimposed on surrounding information of the host vehicle 100 being displayed. The driver can select a target stop position (target parking position selected from among available parking places) from the one or more displayed parking target candidate positions, and receive parking assist for the target stop position.

Next, after the host vehicle 100 is stopped, the driver operates the input device of the in-vehicle display device 9 to select the target stop position from the one or more parking target candidate positions displayed on the in-vehicle display device 9. The parking assist ECU 10 calculates a parking route from a current host vehicle position (a stop position of the host vehicle 100) to the selected target stop position based on information on the target stop position and the above-described obstacle information, and transmits the calculated parking route to the vehicle control ECU 11.

Here, the parking assist ECU 10 calculates the parking route based on the certainty (hereinafter, reliability) of the obstacle information acquired by the sensor of the host vehicle 100. As a result, it is possible to calculate a safe parking route that does not collide with the obstacle, and there is no need to unnecessarily increase the distance to the obstacle, and the driver of the host vehicle 100 does not feel unnatural in vehicle behavior.

The vehicle control ECU 11 assists the driver in a specific operation among a steering wheel operation, an accelerator operation, a brake operation, and the like or all the operations in order to assist the guidance of the host vehicle 100 to the target stop position based on the parking route transmitted from the parking assist ECU 10.

For example, the vehicle control ECU 11 controls a steering angle of the host vehicle 100 by outputting target steering angle information to the electric power steering device 6. Alternatively, the vehicle control ECU 11 outputs a required driving force to a driving force control ECU (not illustrated) that controls a driving force of the host vehicle 100, and outputs a required braking force to a braking force control ECU (not illustrated) that controls a braking force of the host vehicle 100, thereby controlling the speed of the host vehicle 100.

Alternatively, the vehicle control ECU 11 outputs a request for a drive range, a reverse range, or a parking range request to a shift-by-wire controller (not illustrated) that controls a shift range of an automatic transmission, thereby controlling the shift range of the host vehicle 100. When the vehicle control ECU 11 controls the host vehicle 100, the driver can receive appropriate parking assist for parking at the target stop position.

Figure 2:
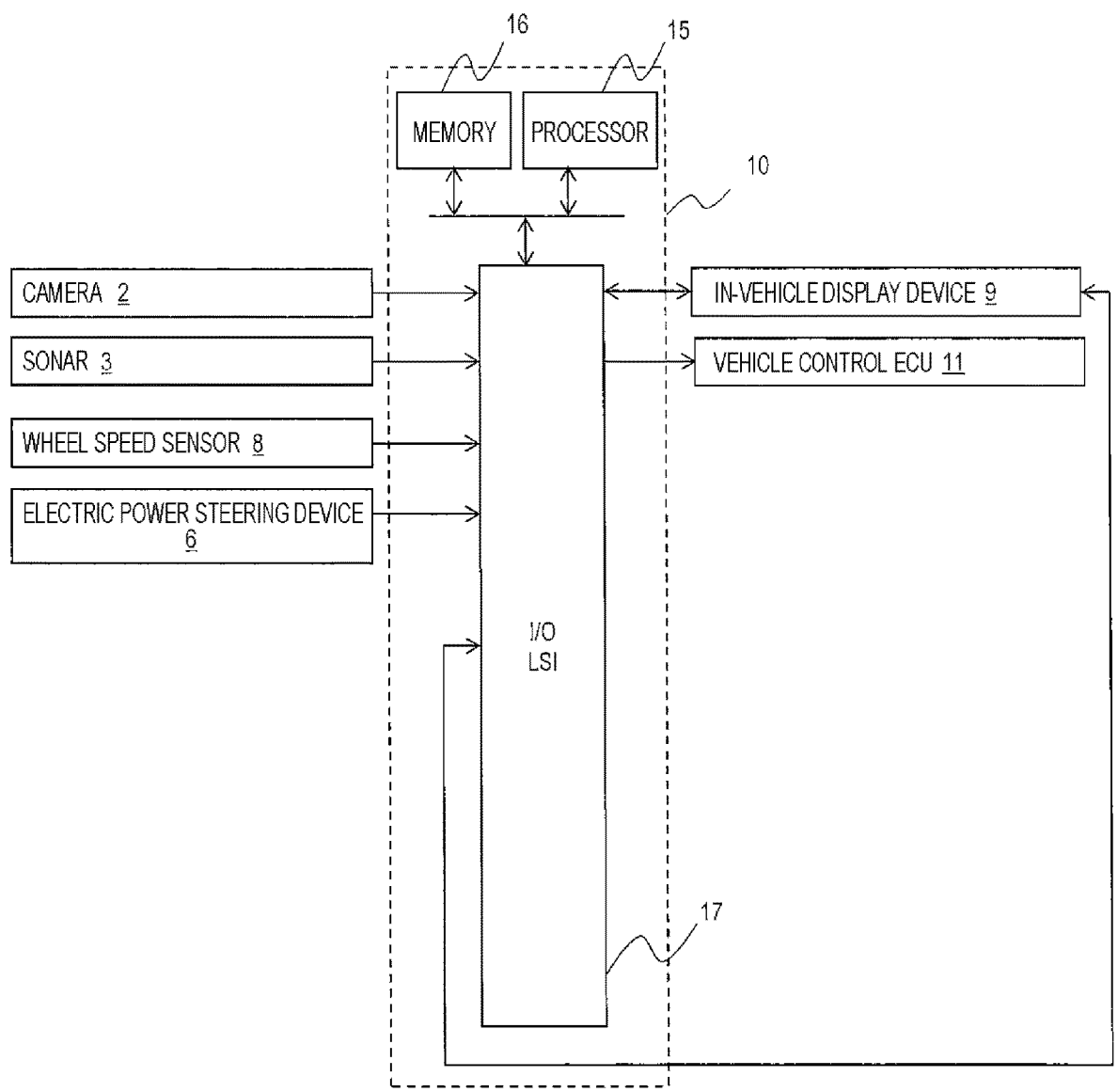
FIG. 2 is a schematic diagram of an internal configuration of a parking assist ECU.

FIG. 2 is a block diagram schematically illustrating an example of an internal configuration of the parking assist ECU 10 illustrated in FIG. 1, and illustrating the relationship between input and output signals of the parking assist ECU 10 illustrated in FIG. 1. The parking assist ECU 10 includes a processor 15, a program executed by the processor, a memory 16 storing data (software) referred to or processed by the program, and an I/O LSI 17 including an A/D converter. These can communicate with each other via a bus.

As described above, signals are input to the parking assist ECU 10 from the camera 2, the sonar 3, the electric power steering device 6, the wheel speed sensor 8, and the in-vehicle display device 9. The parking assist ECU 10 transmits a parking target candidate position available for parking to the in-vehicle display device 9 by a predetermined calculation process, and the in-vehicle display device 9 displays the result. The driver of the host vehicle 100 determines whether to implement parking assist based on the above display content.

Figure 3:
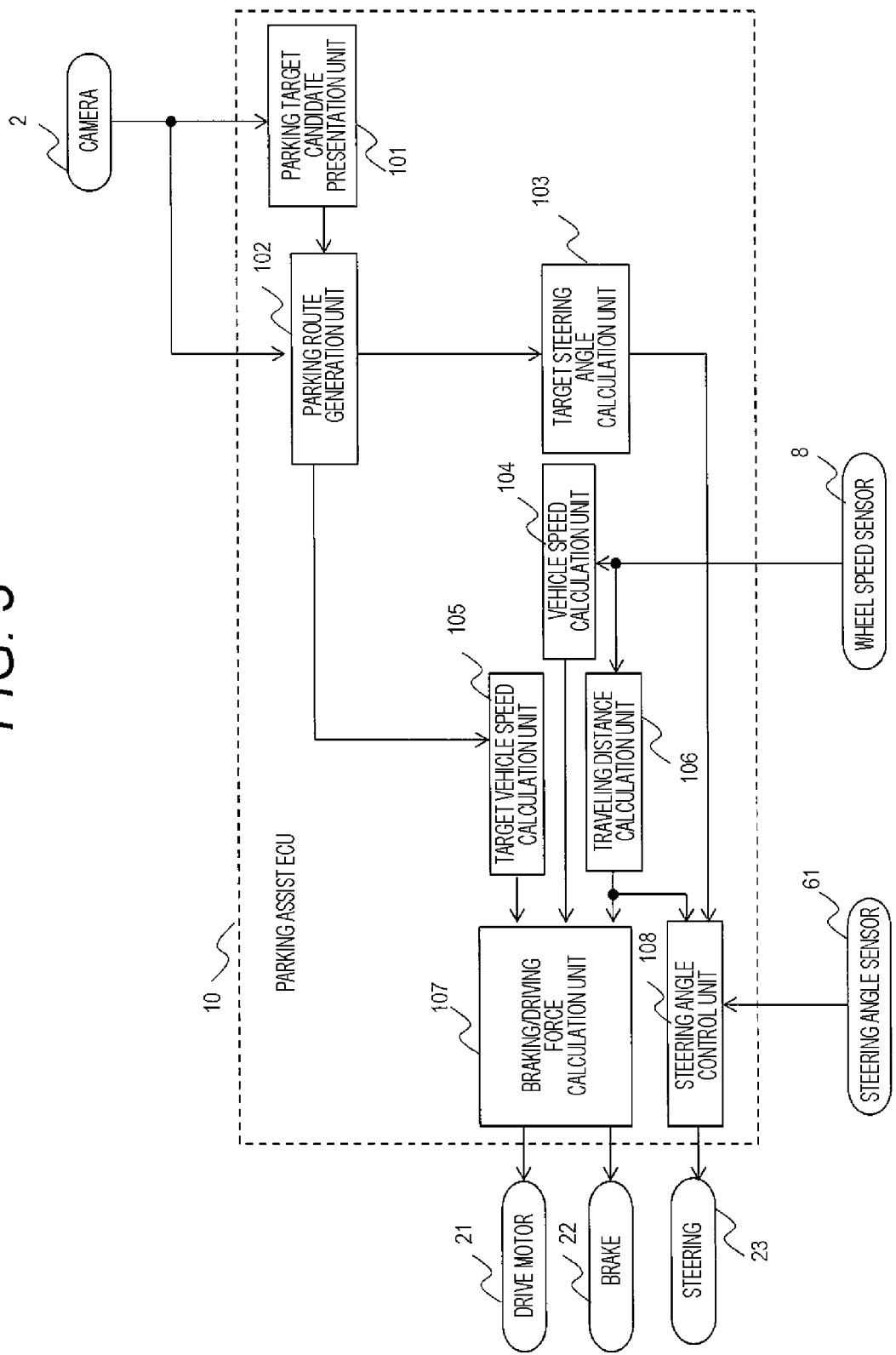
FIG. 3 is a configuration diagram of an internal functional block of the parking assist ECU.

FIG. 3 illustrates an internal functional block configuration of the parking assist ECU 10 illustrated in FIG. 1. Such a functional block is realized by hardware, software, or a combination thereof. It is assumed that the parking assist ECU 10 automatically performs the steering wheel operation, the accelerator operation, and the brake operation in the example to be described hereinafter.

As illustrated in FIG. 3, the parking assist ECU 10 includes a parking target candidate presentation unit 101, a parking route generation unit 102, a target steering angle calculation unit 103. a vehicle speed calculation unit 104, a target vehicle speed calculation unit 105, a traveling distance calculation unit 106, a braking/driving force calculation unit 107, and a steering angle control unit 108.

The parking target candidate presentation unit 101 creates a parking target candidate position from a white line position and an obstacle position detected by the camera 2, and presents one or more parking target candidate positions to the driver through HMI such as the in-vehicle display device 9. The driver selects a target stop position from the parking target candidate positions presented to the parking target candidate presentation unit 101. The parking route generation unit 102 generates a parking route from a current host vehicle position to the target stop position based on the obstacle position detected by the camera 2 and the target stop position selected by the driver.

The target vehicle speed calculation unit 105 generates a target vehicle speed profile based on a route length of the parking route generated by the parking route generation unit 102. The traveling distance calculation unit 106 calculates a traveling distance of the host vehicle 100 since the start of automatic parking based on the number of wheel speed pulses input from the wheel speed sensor 8. The vehicle speed calculation unit 104 calculates the vehicle speed of the host vehicle 100 based on the wheel speed pulse. Specifically, the vehicle speed calculation unit 104 calculates the current vehicle speed of the host vehicle 100 based on the number of wheel speed pulses per unit time input from the wheel speed sensor 8.

The braking/driving force calculation unit 107 calculates a braking force or driving force (collectively referred to as a braking/driving force) based on the target vehicle speed profile generated by the target vehicle speed calculation unit 105, the traveling distance calculated by the traveling distance calculation unit 106, and the vehicle speed calculated by the vehicle speed calculation unit 104. The braking/driving force calculation unit 107 controls the brake 22 or the drive motor 21 via the vehicle control ECU 11 based on the calculated braking/driving force.

The target steering angle calculation unit 103 calculates a steering angle profile that causes the host vehicle to follow the parking route. The steering angle control unit 108 controls steering 23 via the vehicle control ECU 11 based on the traveling distance calculated by the traveling distance calculation unit 106, the steering angle profile generated by the target steering angle calculation unit 103, and a sensor value from the steering angle sensor 61. Note that a sonar, LIDAR, or RADER may be used for obstacle detection, instead of the camera, or an internal combustion engine may be used instead of the drive motor.

Figure 4:
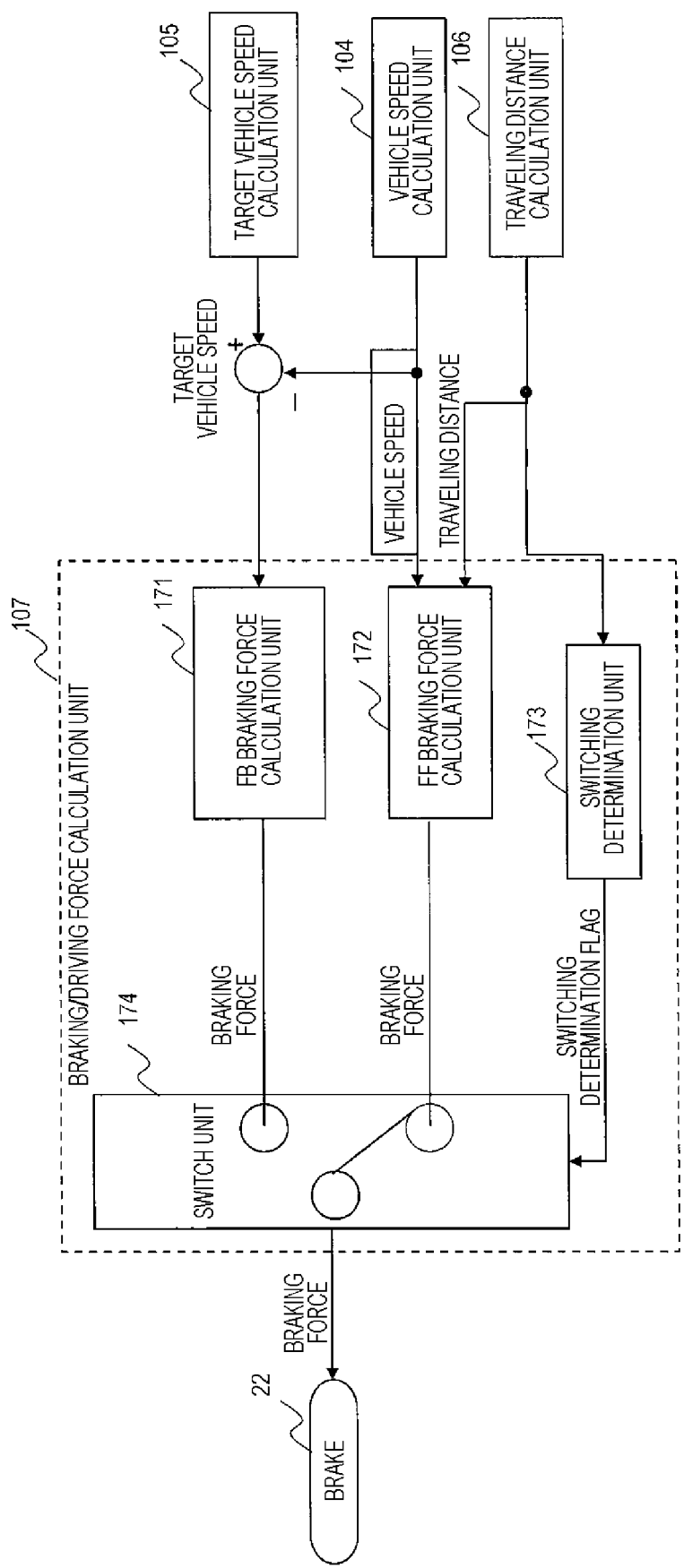
FIG. 4 is a block diagram of braking force control.

FIG. 4 is a block diagram illustrating a logical configuration example of braking force control in the parking assist ECU 10. The braking/driving force calculation unit 107 includes a feedback (FB) braking force calculation unit 171, a feedforward (FF) braking force calculation unit 172, a switching determination unit 173, and a switch unit 174.

The traveling distance calculation unit 106 calculates a traveling distance of the host vehicle 100 since the start of automatic parking based on the wheel speed pulse. The switching determination unit 173 calculates a remaining distance to the target stop position based on the traveling distance calculated by the traveling distance calculation unit 106, and changes a switching determination flag based on the remaining distance. Hereinafter, it is assumed that the switching determination flag is "0" when the remaining distance is larger than a predetermined value, and the switching determination flag is "1" when the remaining distance is equal to or smaller than the predetermined value. The predetermined value is set in advance according to the pulse input interval distance (one wheel speed pulse interval distance).

While the remaining distance is longer than the predetermined value and the switching determination flag is "0", the FB braking force calculation unit 171 performs feedback control of the brake 22 via the vehicle control ECU 11. Specifically, the FB braking force calculation unit 171 calculates a braking force based on a difference between the target vehicle speed profile generated by the target vehicle speed calculation unit 105 and the vehicle speed calculated by the vehicle speed calculation unit 104. The FB braking force calculation unit 171 determines a braking force profile up to the next wheel pulse. The switch unit 174 outputs information indicating the braking force calculated by the FB braking force calculation unit 171 to the vehicle control ECU 11.

When the remaining distance becomes short and the remaining distance calculated in response to a specific wheel speed pulse is equal to or smaller than the predetermined value, the switching determination unit 173 changes the switching determination flag from "0" to "1". In response to the change in the switching determination flag, the switch unit 174 switches the input from the FB braking force calculation unit 171 to the FF braking force calculation unit 172. As a result, the FF braking force calculation unit 172 starts feedforward control of the brake 22 via the vehicle control ECU 11.

The FF braking force calculation unit 172 calculates a braking force (profile) based on the remaining distance to the target stop position and the vehicle speed detection value in the wheel speed pulse in which the switching determination flag is "1". As a result, the braking force can be appropriately determined. The FF braking force calculation unit 172 performs feedforward control of the brake 22 (braking force) via the vehicle control ECU 11 according to the calculated braking force. The switch unit 174 outputs information indicating the braking force calculated by the FF braking force calculation unit 172 to the vehicle control ECU 11. Note that the wheel speed pulse used for the feedforward control of the FF braking force calculation unit 172 may be later than the wheel speed pulse for changing the switching determination flag.

Specifically, the FF braking force calculation unit 172 calculates a remaining distance to the target stop position based on the traveling distance calculated by the traveling distance calculation unit 106, acquires a vehicle speed from the vehicle speed calculation unit 104, and determines a braking force based on those values. The FF braking force calculation unit 172 determines the braking force without comparing the target vehicle speed with the vehicle speed detection value, and controls the brake 22 according to the braking force determined at the start, independently of (without referring to) the actual vehicle speed after the start of control.

Figure 5:
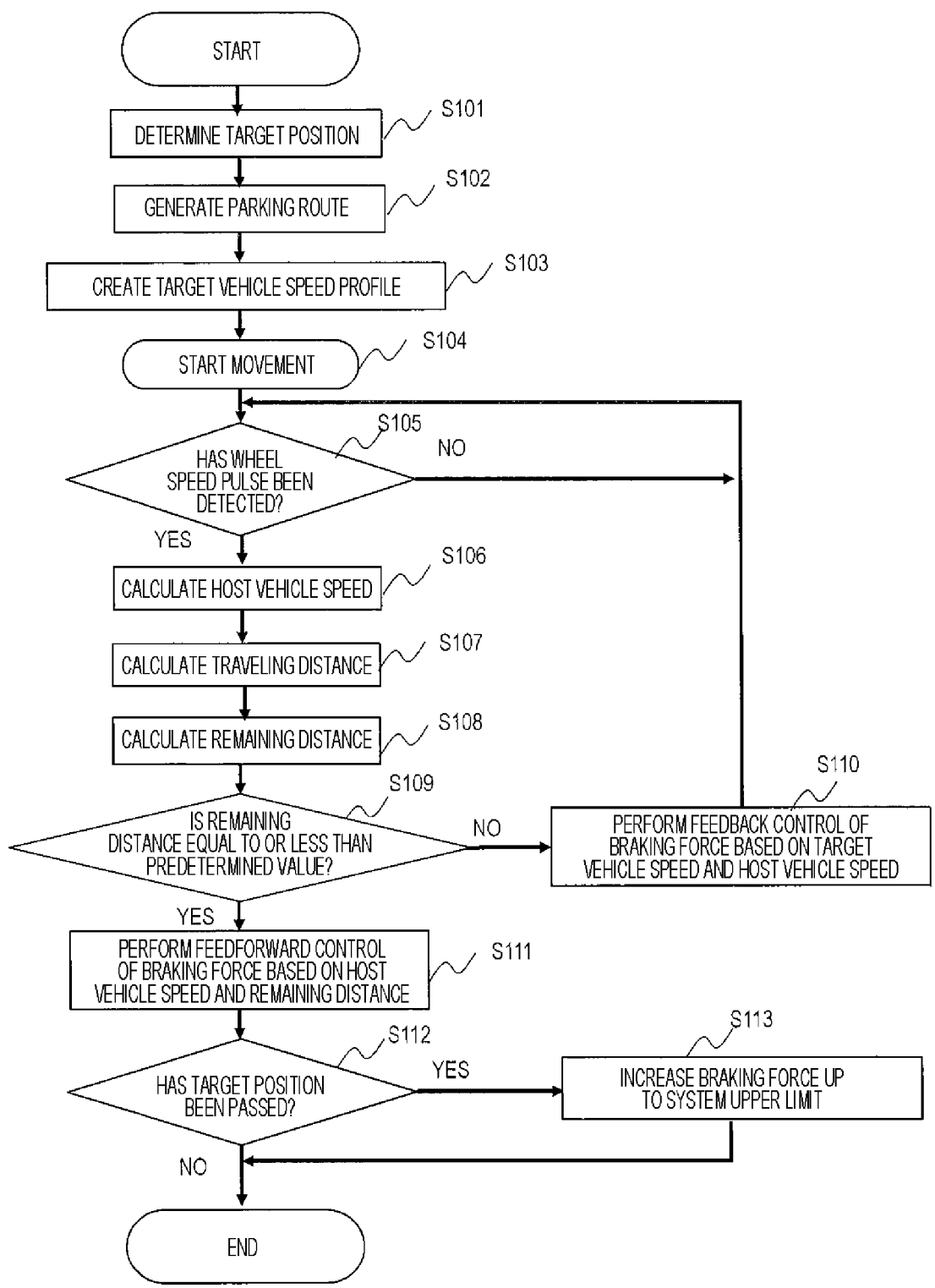
FIG. 5 is a flowchart according to a first embodiment.

FIG. 5 is a flowchart of a parking assist process of the parking assist ECU 10. First, the parking target candidate presentation unit 101 determines a target stop position (S101). Specifically, the parking target candidate presentation unit 101 creates one or more parking target candidate positions from a white line position and an obstacle position detected by the camera 2, and presents one or more parking target candidate positions to the driver through the HMI such as the in-vehicle display device 9. The driver selects a target position from the parking target candidate positions presented by the parking target candidate presentation unit 101, and the parking target candidate presentation unit 101 determines the selected parking target candidate position as the target stop position.

After determining the target stop position, the parking route generation unit 102 generates a parking route from a current host vehicle position to the target position based on the obstacle position detected by the camera 2 and the target stop position selected by the driver (S102). The target vehicle speed calculation unit 105 generates a target vehicle speed profile based on a route length of the parking route generated by the parking route generation unit 102 (S103). Thereafter, the parking assist ECU 10 starts automatic parking, and the vehicle 100 starts moving (S104).

When the wheel speed pulse is detected after the start of movement of the host vehicle 100 (S105: YES), the vehicle speed calculation unit 104 calculates a vehicle speed of the host vehicle 100 (S106). The traveling distance calculation unit 106 calculates a traveling distance of the host vehicle since the start of automatic parking (S107). The switching determination unit 173 calculates a remaining distance to the target stop position based on the traveling distance calculated by the traveling distance calculation unit 106 (S108).

When the remaining distance is larger than the predetermined value (S109: NO), the switching determination flag is "0" set at the start of parking assist. The switch unit 174 selects the output from the FB braking force calculation unit 171. The FB braking force calculation unit 171 calculates a braking force based on the target vehicle speed indicated by the target vehicle speed profile and the detected host vehicle speed, and performs feedback control of the braking force using the brake 22 via the vehicle control ECU 11 (S110).

When the remaining distance calculated by the wheel speed pulse becomes a value equal to or smaller than the predetermined value (S109: YES), the switching determination unit 173 changes the switching determination flag from "0" to "1". The switch unit 174 switches the input from the output of the FB braking force calculation unit 171 to the output of the FF braking force calculation unit 172.

The FF braking force calculation unit 172 calculates a braking force based on the host vehicle speed and the remaining distance calculated from the wheel speed pulse in which the switching determination flag is "1". The FF braking force calculation unit 172 performs feedforward control of the brake 22 (braking force) via the vehicle control ECU 11 according to the calculated braking force (S111), and stops the host vehicle 100 at the target stop position (S112: NO). Details of Step S113 when the host vehicle 100 does not stop at the target stop position (S112: YES) will be described later.

Figure 7:
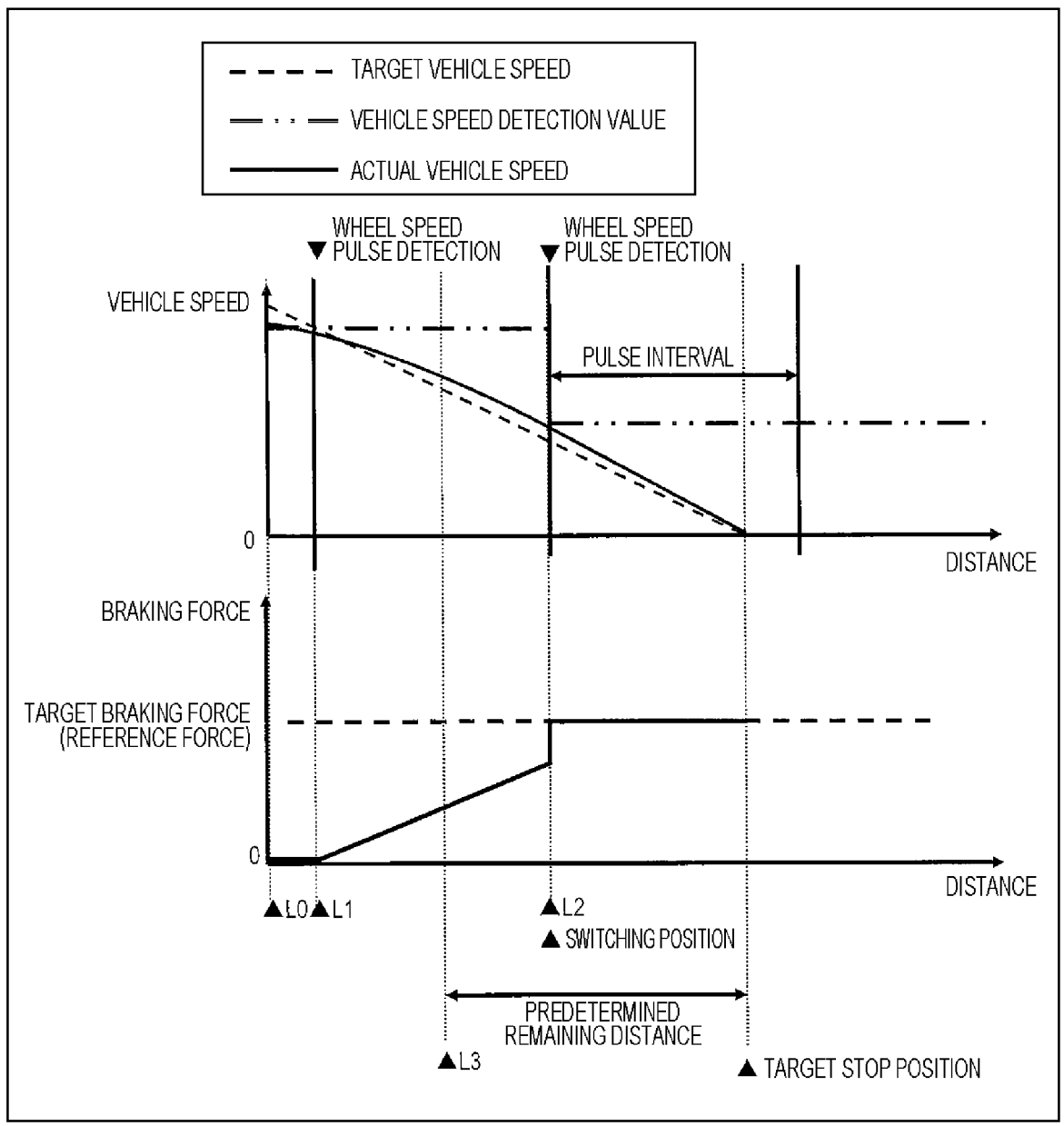
FIG. 7 illustrates graphs of a vehicle speed and a braking force with respect to a distance in a case where braking force control is switched from feedback control to feedforward control when a remaining distance falls below a predetermined value.

FIG. 7 is a graph of a vehicle speed and a braking force with respect to a distance when a remaining distance is equal to or smaller than a predetermined value and the braking force is calculated based on a detected host vehicle speed and the remaining distance and is subjected to feedforward control. In the graph of the vehicle speed, the horizontal axis represents the distance from the start of parking assist, and the vertical axis represents the vehicle speed.

In the graph of the braking force, the horizontal axis represents the distance from the start of parking assist, and the vertical axis represents the braking force. A dashed line indicates a target vehicle speed profile, a two-dot chain line indicates a vehicle speed detection value, and a solid line indicates an actual vehicle speed.

In the example of FIG. 7, the vehicle speed detection value is less than the target vehicle speed from distances L0 to L1, and thus, the acceleration feedback control works, and the braking force becomes zero. From distances L1 to L2, the vehicle speed detection value is more than the target vehicle speed, and thus, the feedback control works, and the braking force increases. It is assumed that the remaining distance from a position of distance L3 to a target stop position is the predetermined value.

When the remaining distance to the target stop position becomes smaller than the predetermined value, the braking force control is switched from the FB braking force calculation unit 171 to the FF braking force calculation unit 172. In the example of FIG. 7, the first wheel speed pulse after the remaining distance becomes equal to or smaller than the predetermined value is detected at a position of the distance L2. The FF braking force calculation unit 172 calculates a target braking force for stop at the target stop position is calculated with a constant braking force based on a vehicle speed detection value calculated by the wheel speed pulse at the position (distance L2) and the remaining distance, and performs feedforward control of the braking force. In the example of FIG. 7, the target braking force is constant, and simple control is possible. Note that the target braking force in the example of FIG. 7 is also called a reference force.

Figure 6:
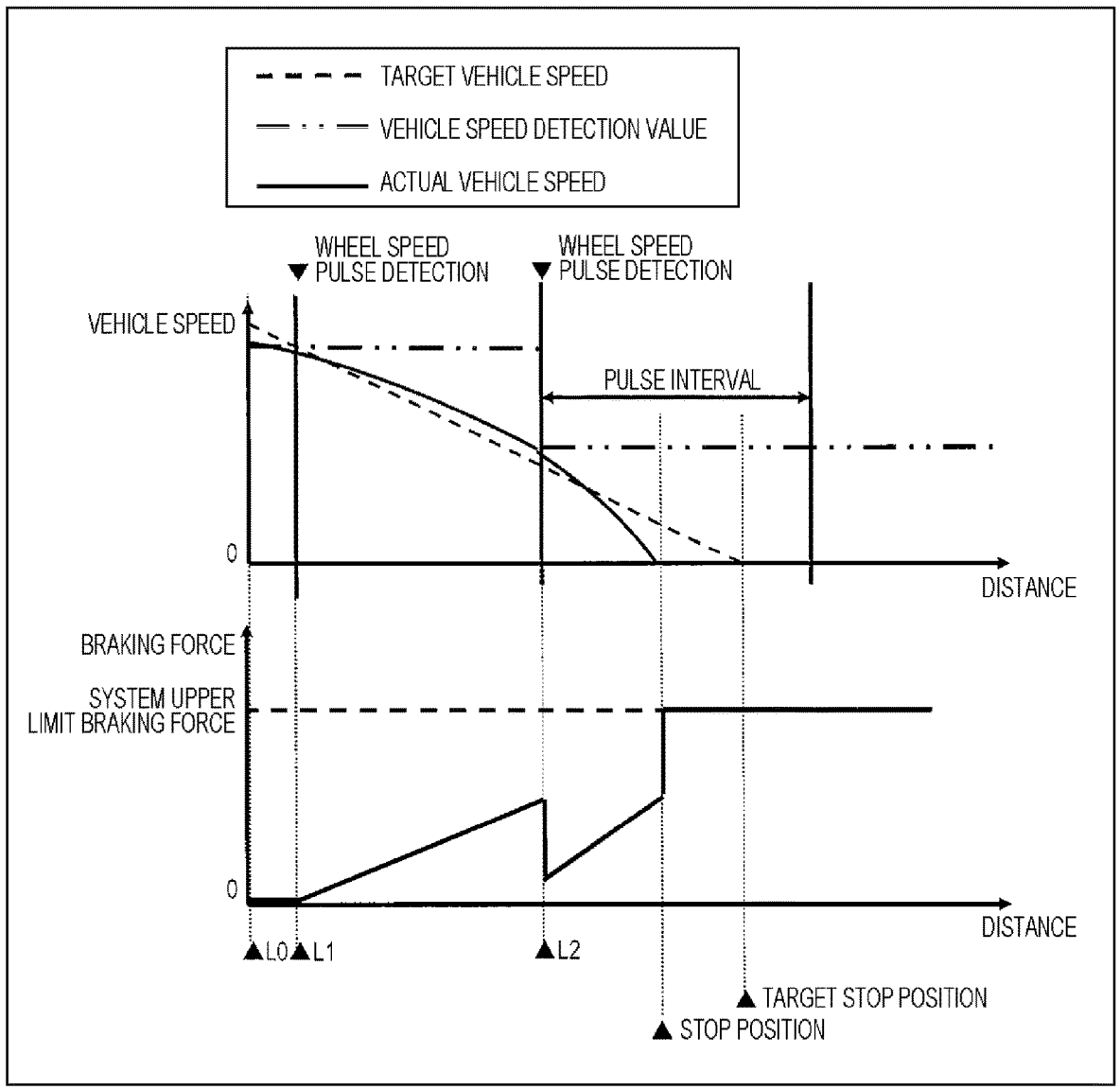
FIG. 6 illustrates graphs of a vehicle speed and a braking force with respect to a distance when a braking force is controlled only by feedback control according to a comparative example.

With the control of the FF braking force calculation unit 172, the vehicle 100 can stop at a position closer to the target parking position. Further, an inclination of the vehicle speed can be made gentler as compared with a comparative example described with reference to FIG. 6, so that the riding comfort can be improved.

In another example, the FB braking force calculation unit 171 may correct a braking force for feedforward control according to the followability to a target vehicle speed profile during feedback control.

The FB braking force calculation unit 171 determines the braking force in feedforward control based on a difference between the target vehicle speed in the feedback control and a vehicle speed detection value. For example, the FB braking force calculation unit 171 acquires the difference between the target vehicle speed and the vehicle speed detection value in one or a plurality of wheel speed pulses in which the braking force during feedback control is larger than 0, and determines a statistical value such as an average value and an integral value.

The FB braking force calculation unit 171 corrects the constant braking force value described with reference to FIG. 7 based on the statistical value. Note that the statistical value of a difference in the single wheel speed pulse matches the difference.

For example, when the statistical value indicates that the vehicle speed detection value is more than the target vehicle speed, the FB braking force calculation unit 171 may correct the braking force such that the braking force increases as (an absolute value) of the difference increases. On the other hand, when the vehicle speed detection value is less than the target vehicle speed, the FB braking force calculation unit 171 may correct the braking force such that the braking force decreases as (the absolute value) of the difference increases. According to this example, the feedforward control can be performed in consideration of braking characteristics of the host vehicle 100, and thus, it is possible to improve the vehicle stop accuracy with respect to changes in vehicle weight and friction characteristics of the brake.

Second Embodiment

Figure 8:
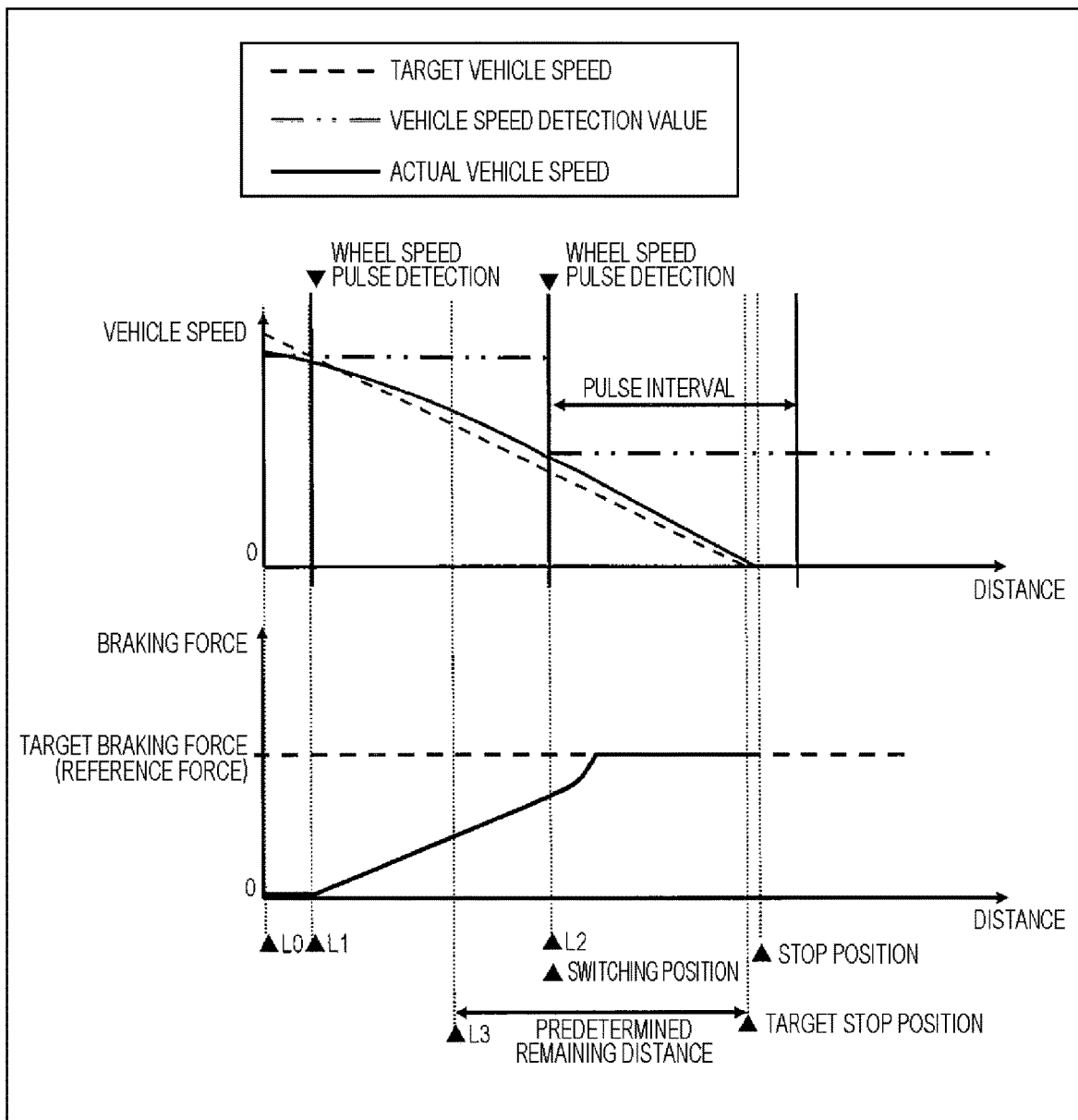
FIG. 8 illustrates graphs of a vehicle speed and a braking force with respect to a distance in a case where braking force control is switched from feedback control to feedforward control to increase the braking force at a predetermined increase rate and maintain a constant braking force when a remaining distance falls below a predetermined value.

FIG. 8 illustrates graphs of a vehicle speed and a braking force with respect to a distance in an example of feedforward control.

Differences from FIG. 7 will be mainly described hereinafter. In the example of FIG. 7, a change in braking force at a start point of feedforward control is a step change to the target braking force. As a result, simple control is realized. In the example of FIG. 8, the braking force gradually increases from a start point of the feedforward control. For example, the braking force increases at a constant increase rate over time. The riding comfort can be improved since the increase in braking force is not the step change but the gradual increase.

Figure 9:
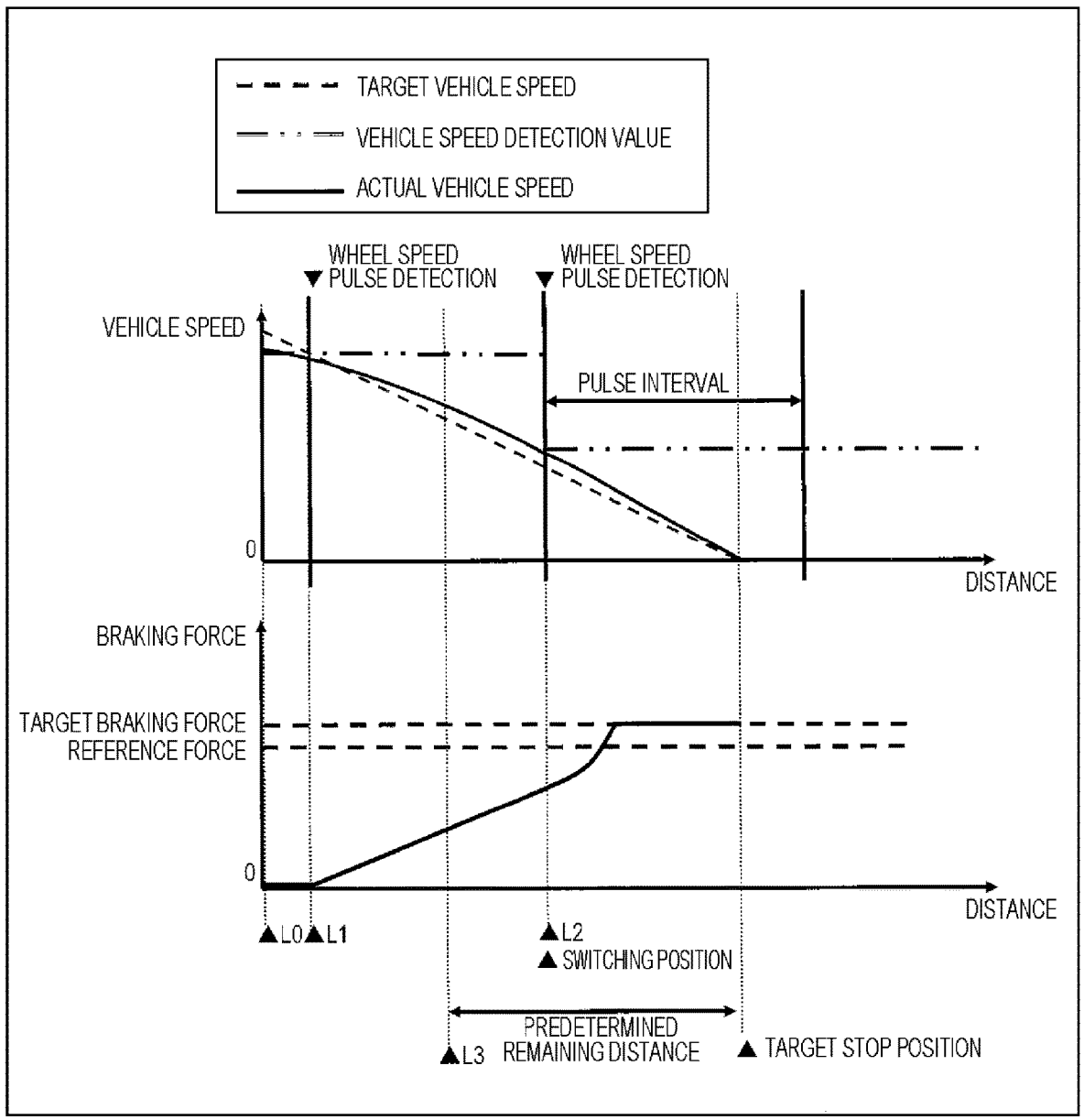
FIG. 9 illustrates graphs of a vehicle speed and a braking force with respect to a distance in a case where braking force control is switched from feedback control to feedforward control to increase the braking force at a predetermined increase rate and maintain a constant braking force when a remaining distance falls below a predetermined value.

FIG. 9 illustrates graphs of a vehicle speed and a braking force with respect to a distance in another example of feedforward control. Differences from FIG. 8 will be mainly described hereinafter. In the example of FIG. 8, the braking force is insufficient so that it is difficult for the vehicle 100 to stop at the target stop position. The FF braking force calculation unit 172 may increase a target braking force (an increase amount of the braking force) under the same conditions as compared with the case where the braking force is increased to the target value by the step change as illustrated in FIG. 7. FIG. 9 illustrates an example in which the increase amount of the braking force is made more than that in the step change illustrated in FIG. 7 in the example in which the braking force is gradually increased.

Figure 10:
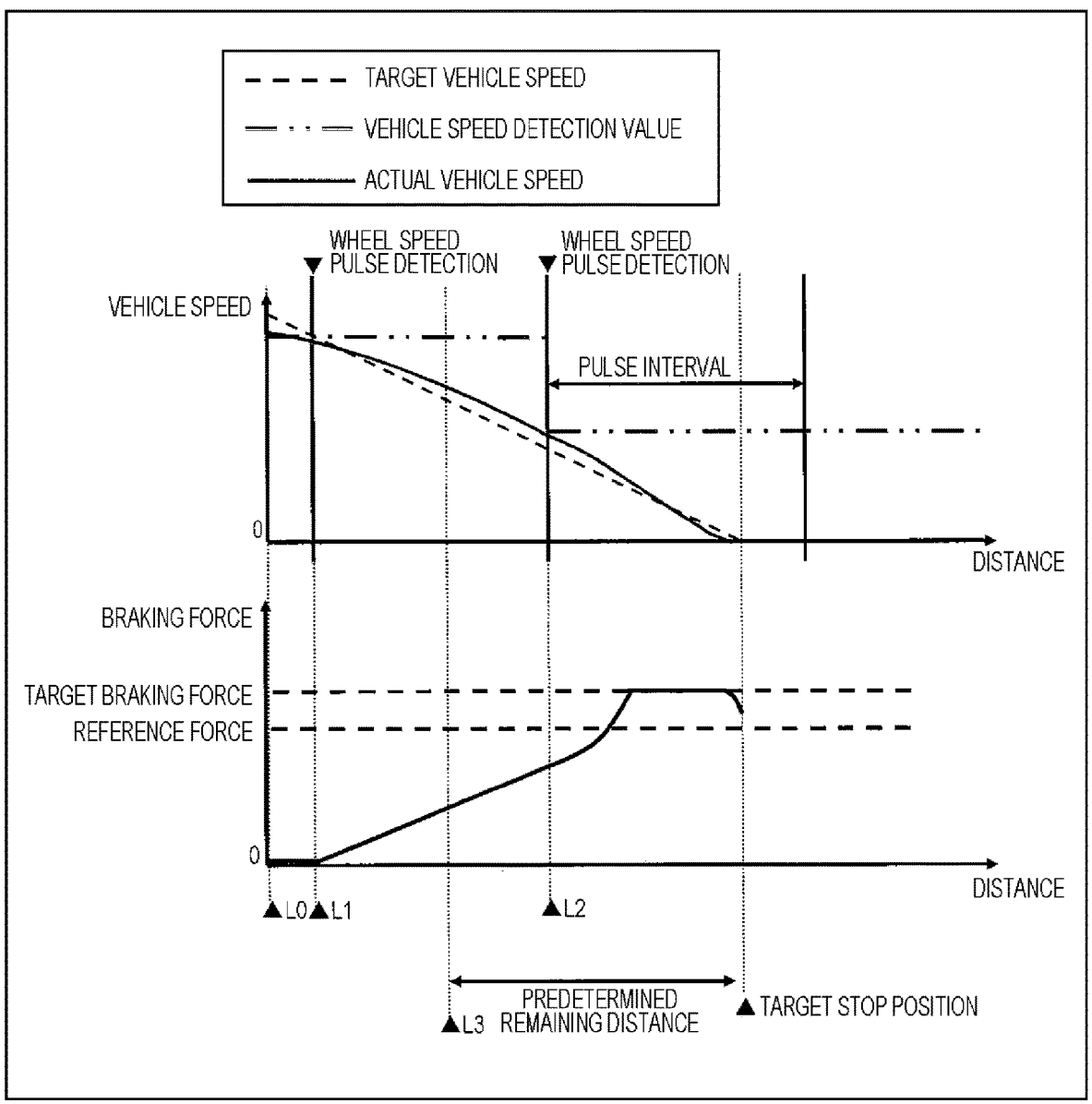
FIG. 10 illustrates graphs of a vehicle speed and a braking force with respect to a distance in a case where braking force control is switched from feedback control to feedforward control to increase the braking force at a predetermined increase rate and maintain a constant braking force when a remaining distance falls below a predetermined value, and then, the braking force is decrease at a predetermined decrease rate.

FIG. 10 illustrates graphs of a vehicle speed and a braking force with respect to a distance in still another example of feedforward control. Differences from FIG. 9 will be mainly described hereinafter. In the example of FIG. 10, the FF braking force calculation unit 172 gradually decreases a braking force just before the vehicle 100 stops. For example, a decrease rate of the braking force over time is constant. As a result, the riding comfort can be improved. In the examples of FIGS. 7, 9 and 10, the vehicle 100 is stopped at the target stop position. In these drawings, the area of a region surrounded by the braking force from the position of the distance L2 to the target stop position and the horizontal axis (the work of the braking force) is the same.

In the examples described with reference to FIGS. 8, 9 and 10, the FF braking force calculation unit 172 increases the braking force from an immediately previous value in the feedback control. When the vehicle speed is low at the point of switching from the feedback control to the feedforward control, the FF braking force calculation unit 172 decreases the braking force. That is, the target braking force is smaller than the braking force in the immediately previous feedback control. The FF braking force calculation unit 172 gradually decreases the braking force from the start of the feedforward control in the examples described with reference to FIGS. 8, 9 and 10.

Third Embodiment

Hereinafter, control for a case where the vehicle 100 passes without stopping at a target stop position will be described. For example, there is a case where it is difficult for the vehicle 100 to stop even if reaching a target parking position due to a disturbance such as a gradient after a remaining distance to a target parking position becomes smaller than a predetermined value and braking force control is switched from feedback control to feedforward control. In the example to be described hereinafter, the parking assist ECU 10 increases a braking force to a system upper limit value when detecting that the vehicle 100 has passed without stopping at the target parking position.

Figure 11:
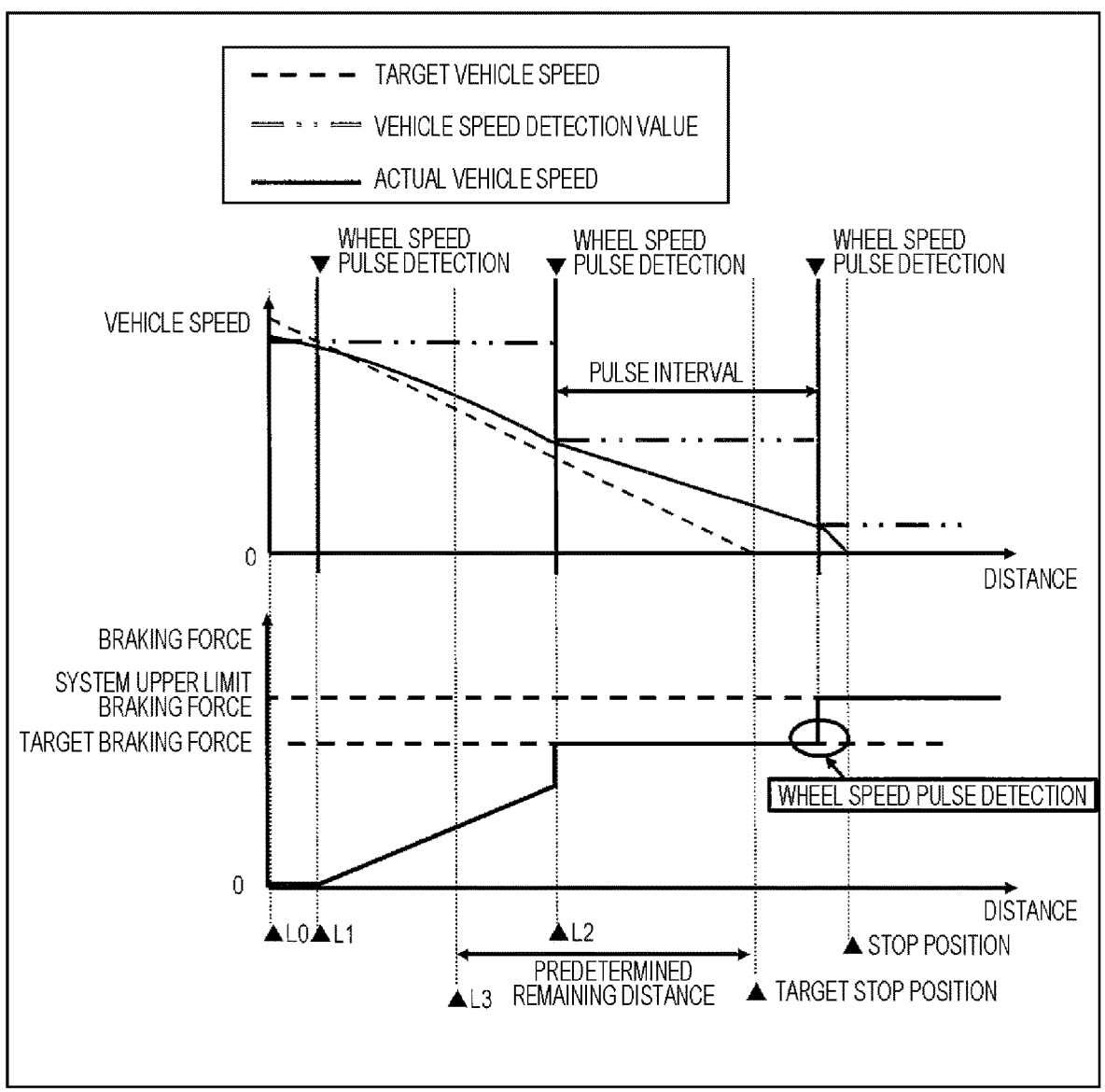
FIG. 11 illustrates graphs of a vehicle speed and a braking force with respect to a distance in a case where braking force control is switched from feedback control to feedforward control when a remaining distance falls below a predetermined value, and then, the braking force is increased to a system upper limit for detection that a host vehicle has passed a target parking position.

FIG. 11 illustrates graphs of a vehicle speed and a braking force with respect to a distance in an example of feedforward control. Differences from FIG. 7 will be mainly described hereinafter. In the example of FIG. 11, the vehicle 100 has not stopped at the target parking position after the remaining distance becomes equal to or shorter than a predetermined value and the parking assist ECU 10 switches the braking force control to the feedforward control. The parking assist ECU 10 increases the braking force to the system upper limit value when determining that the vehicle has failed to stop.

When detecting a wheel speed pulse that is not detected in a case where the host vehicle 100 can stop at the target position, the FF braking force calculation unit 172 determines that the host vehicle 100 has failed to stop at the target position. The FF braking force calculation unit 172 increases the braking force to the system upper limit value. As a result, an error between an actual stop position and the target stop position can be reduced.

Figure 12:
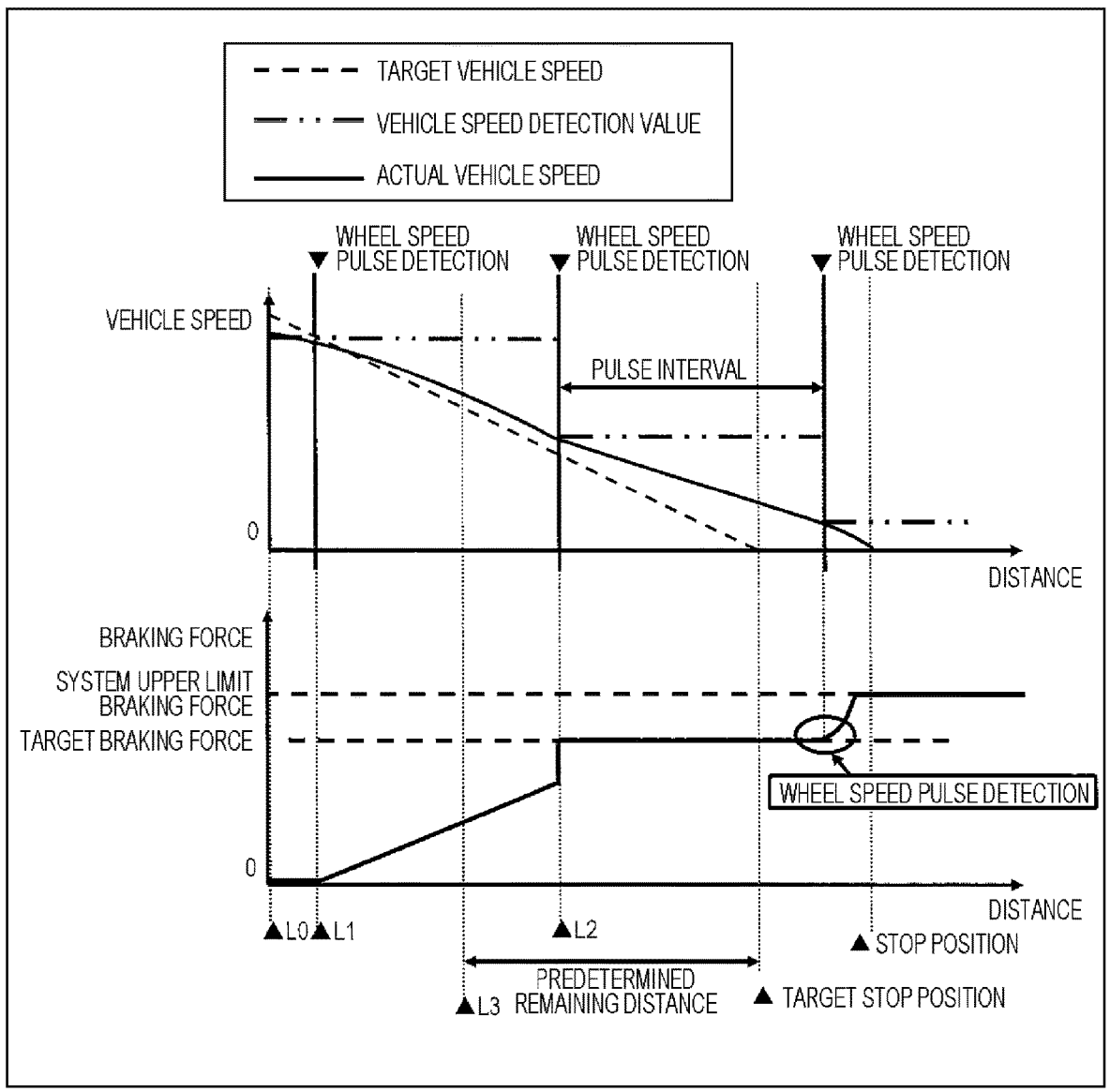
FIG. 12 illustrates graphs of a vehicle speed and a braking force with respect to a distance in a case where braking force control is switched from feedback control to feedforward control when a remaining distance falls below a predetermined value, and then, the braking force is increased at a predetermined increase rate to a system upper limit for detection that a host vehicle has passed a target parking position.

FIG. 12 illustrates graphs of a vehicle speed and a braking force with respect to a distance in still another example of feedforward control. Differences from FIG. 11 will be mainly described hereinafter. When the FF braking force calculation unit 172 detects a wheel speed pulse after passing a target stop position, the FF braking force calculation unit 172 calculates a vehicle speed of the host vehicle 100 using the wheel speed pulse. Instead of a step change illustrated in FIG. 11, the FF braking force calculation unit 172 gradually increases a braking force at an increase rate according to the vehicle speed of the host vehicle 100 calculated using the wheel speed pulse. The FF braking force calculation unit 172 may increase the braking force at a constant increase rate over time, for example. The riding comfort can be improved by gradually increasing the braking force.

Note that the FF braking force calculation unit 172 may increase the braking force to a value smaller than the system upper limit value. This can also reduce the error between the target stop position and the actual stop position. The increase to the system upper limit value can reduce the error between the target stop position and the actual stop position. The FF braking force calculation unit 172 may determine an increase amount of the braking force (braking force after the increase) according to a vehicle speed determined from a wheel speed pulse detected at a position ahead of the target stop position.

Fourth Embodiment

The timing for switching a braking force control method will be described hereinafter. The parking assist ECU 10 switches braking force control from feedback control to feedforward control until a remaining distance to a target stop position becomes equal to or less than one wheel speed pulse interval distance. The feedforward control calculates a braking force for stopping at the target stop position based on the remaining distance and a vehicle speed detection value determined from a wheel speed pulse at the time of switching.

An example of a predetermined value used to determine the switching of the braking force control method is one wheel speed pulse interval distance or more and two wheel speed pulse interval distance or less. The one wheel speed pulse interval distance is the distance by which the vehicle 100 progresses between consecutive wheel speed pulses.

Figure 13:
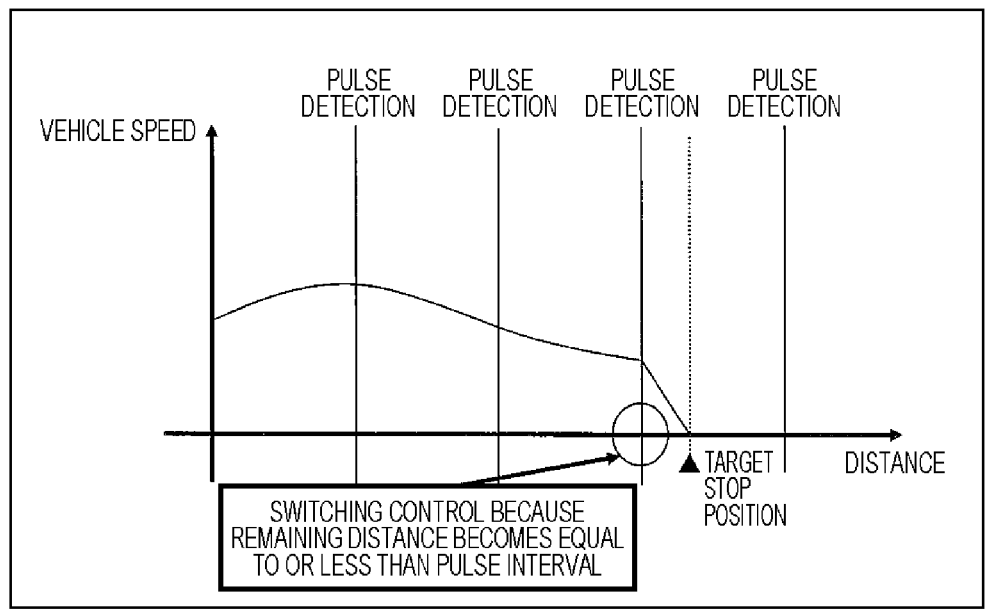
FIG. 13 is a graph of a vehicle speed with respect to a distance when a predetermined value for switching braking force control from feedback control to feedforward control is set to a distance by which a vehicle progresses with one pulse input.

FIG. 13 is a graph of a braking force with respect to a distance when a predetermined value is set to one wheel speed pulse interval distance. A distance from a control switching position to a target stop position is one wheel speed pulse interval distance or less. In the example of FIG. 13, a remaining distance is short when the remaining distance is equal to or smaller than a predetermined value and the braking force control is switched from the feedback control to the feedforward control, and thus, the braking force for stop at the target stop position is large, and the vehicle speed changes rapidly.

Figure 14:
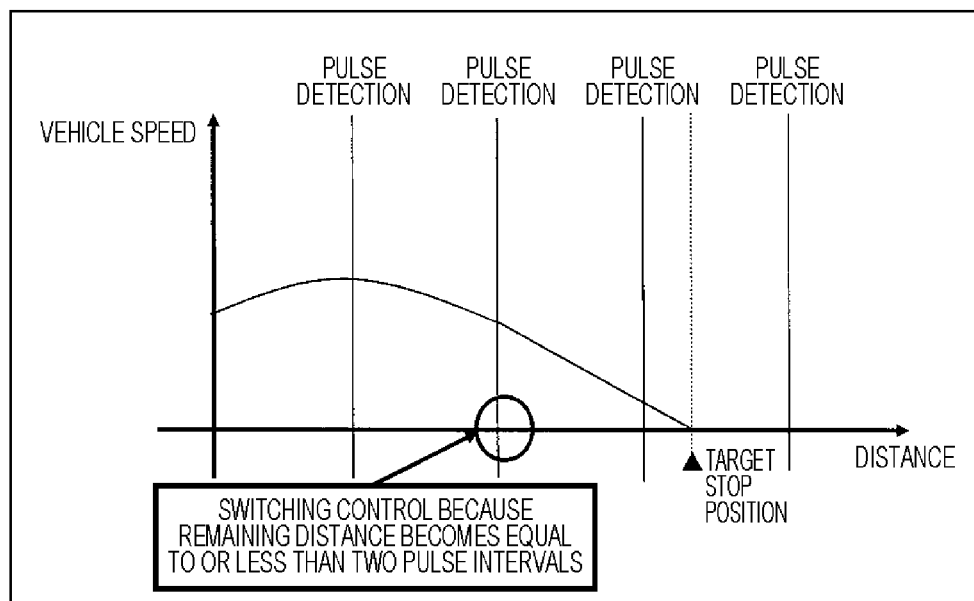
FIG. 14 is a graph of a vehicle speed with respect to a distance in a case where a predetermined value indicating a condition for switching braking force control from feedback control to feedforward control is set to a distance by which a vehicle progresses in two wheel speed pulses.

On the other hand, FIG. 14 is a graph of a braking force with respect to a distance when the predetermined value is set to two wheel speed pulse interval distances. A distance from a control switching position to a target stop position is one wheel speed pulse interval distance or more and two wheel speed pulse interval distance or less.

A remaining distance when the remaining distance becomes equal to or smaller than the predetermined value and the braking force control is switched from the feedback control to the feedforward control is at least one wheel speed pulse interval distance. As compared with the case of FIG. 13, the braking force for stop at the target parking position is small, the vehicle speed can be changed gently, and the riding comfort can be improved. Note that the change in vehicle speed can be made gentle if the predetermined value is large, so that the riding comfort is improved. However, the distance of feedforward control becomes longer, and the vehicle stop accuracy deteriorates due to a disturbance such as a gradient. Therefore, it is necessary to appropriately set the predetermined value from the viewpoint of the accuracy of feedback control and feedforward control.

Note that the present invention is not limited to the above-described embodiments, but includes various modifications. For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be added to a configuration of a certain embodiment. Further, addition, deletion or substitution of other configurations can be made with respect to some configurations of each embodiment.

Further, a part or all of each of the above-described configurations, functions, processing units, processing means, and the like may be realized, for example, by hardware by designing with an integrated circuit and the like. Further, the above-described respective configurations, functions and the like may be realized by software by the processor interpreting and executing a program for realizing the respective functions. Information such as programs, tables, and files that realize the respective functions can be installed in a recording device such as a memory, a hard disk, and a solid state drive (SSD), or a recording medium such as an IC card, and an SD card.

Further, only a control line and an information line considered to be necessary for the description have been illustrated, and all control lines and information lines required for a product are not illustrated. It may be considered that most of the configurations are practically connected to each other.

REFERENCE SIGNS LIST 2 camera
3 sonar
6 electric power steering device
7FR, 7RR, 7RL, 7FL wheel
8FR, 8RR, 8RL, 8FL wheel speed sensor
9 in-vehicle display device
10 parking assist ECU
11 vehicle control ECU
18 steering wheel
100 vehicle

The invention claimed is:

1. A parking assist device, which assists parking of a vehicle at a target stop position, comprising:
    a traveling distance calculation unit that calculates a traveling distance of the vehicle based on a wheel speed pulse; and
    a braking/driving force calculation unit that determines a remaining distance to the target stop position based on the traveling distance, and switches control of the braking force of the vehicle from feedback control to feedforward control when the remaining distance becomes a value equal to or less than a predetermined value.

2. The parking assist device according to claim 1, wherein the predetermined value is one wheel speed pulse interval distance or more and two wheel speed pulse interval distances or less.

3. The parking assist device according to claim 1, further comprising
    a vehicle speed calculation unit that calculates a vehicle speed of the vehicle based on the wheel speed pulse,
    wherein the braking/driving force calculation unit determines the braking force of the vehicle in the feedforward control based on the remaining distance and a vehicle speed calculated by the vehicle speed calculation unit when switching from the feedback control to the feedforward control.

4. The parking assist device according to claim 3, wherein the braking force determined by the feedforward control is constant up to the target stop position.

5. The parking assist device according to claim 3, wherein the braking/driving force calculation unit determines the braking force of the vehicle in the feedforward control based on a difference between a target vehicle speed in the feedback control and the vehicle speed calculated by the vehicle speed calculation unit.

6. The parking assist device according to claim 1, wherein the braking/driving force calculation unit determines a target braking force value in the feedforward control, and gradually changes the braking force of the vehicle from a value obtained by the feedback control to the target braking force value.

7. The parking assist device according to claim 6, wherein the braking/driving force calculation unit gradually decreases the braking force from the target braking force value from a front of the target stop position to the target stop position in the feedforward control.

8. The parking assist device according to claim 1, wherein the braking/driving force calculation unit increases the braking force of the vehicle when detecting that the vehicle has passed the target stop position.

9. The parking assist device according to claim 8, wherein the braking/driving force calculation unit increases the braking force of the vehicle to a system upper limit value.

10. The parking assist device according to claim 8, wherein
    the braking/driving force calculation unit gradually increases the braking force of the vehicle at an increase rate calculated based on a vehicle speed when detecting that the vehicle has failed to stop at the target stop position.

11. A method for assisting parking of a vehicle at a target stop position, comprising:
    calculating a traveling distance of the vehicle based on a wheel speed pulse;
    determining a remaining distance to the target stop position based on the traveling distance; and
    switching control of the braking force of the vehicle from feedback control to feedforward control when the remaining distance becomes a value equal to or less than a predetermined value.

* * * * *